United States Patent
Yamasaki et al.

(10) Patent No.: US 9,055,516 B2
(45) Date of Patent: Jun. 9, 2015

(54) WIRELESS COMMUNICATION APPARATUS SELECTING ONE OF DIRECT COMMUNICATION PATH AND INDIRECT COMMUNICATION PATH VIA ACCESS POINT APPARATUS

(75) Inventors: Akira Yamasaki, Osaka (JP); Osamu Tanaka, Osaka (JP); Toyoshi Yamada, Osaka (JP); Nobuhiko Arashin, Osaka (JP); Akihiko Shiotsuki, Osaka (JP); Masahiko Nagoshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 326 days.

(21) Appl. No.: 13/555,487

(22) Filed: Jul. 23, 2012

(65) Prior Publication Data

US 2012/0287807 A1 Nov. 15, 2012

Related U.S. Application Data

(63) Continuation of application No. PCT/JP2012/000524, filed on Jan. 27, 2012.

(30) Foreign Application Priority Data

Feb. 16, 2011 (JP) .................................. 2011-030478

(51) Int. Cl.
*H04W 40/12* (2009.01)
*H04W 24/10* (2009.01)
*H04W 76/02* (2009.01)

(52) U.S. Cl.
CPC .............. *H04W 40/12* (2013.01); *H04W 24/10* (2013.01); *H04W 76/023* (2013.01)

(58) Field of Classification Search
CPC .... H04W 40/12; H04W 24/10; H04W 76/023
See application file for complete search history.

(56) References Cited

U.S. PATENT DOCUMENTS 7,787,416 B2 * 8/2010 Gidwani ....................... 370/329
7,933,247 B2 * 4/2011 Gidwani ....................... 370/332
(Continued)

FOREIGN PATENT DOCUMENTS

JP 2006-25335 1/2006
JP 2007-89151 4/2007
(Continued)

OTHER PUBLICATIONS

International Preliminary Report on Patentability and Written Opinion of the International Searching Authority issued Aug. 21, 2013 in International (PCT) Application No. PCT/JP2012/000524.
(Continued)

*Primary Examiner* — Andrew Lai
*Assistant Examiner* — Hoyet H Andrews
(74) *Attorney, Agent, or Firm* — Wenderoth, Lind & Ponack, L.L.P.

(57) ABSTRACT

A first wireless communication apparatus acquires communication qualities of a first communication path, a second communication path and a direct communication path, respectively, adopts as a communication quality of an indirect communication path a lower communication qualities selected from the communication qualities of the first and second communication paths, and selects a communication path having a higher one of a communication performance corresponding to the direct communication path and a communication performance corresponding to the indirect communication path.

5 Claims, 8 Drawing Sheets (56) References Cited

U.S. PATENT DOCUMENTS

| | | | |
|---|---|---|---|
| 2007/0008922 A1* | 1/2007 | Abhishek et al. | 370/329 |
| 2007/0064643 A1* | 3/2007 | Tavares | 370/328 |
| 2007/0066240 A1* | 3/2007 | Hart | 455/69 |
| 2007/0147308 A1* | 6/2007 | Hart | 370/332 |
| 2008/0045147 A1 | 2/2008 | Okuda | |
| 2009/0168689 A1 | 7/2009 | Itagaki et al. | |
| 2009/0168736 A1 | 7/2009 | Itagaki et al. | |
| 2010/0061334 A1* | 3/2010 | Gault et al. | 370/330 |
| 2011/0122835 A1* | 5/2011 | Naito et al. | 370/329 |
| 2012/0014278 A1* | 1/2012 | Ameti et al. | 370/252 |
| 2012/0057489 A1* | 3/2012 | Shiotsuki et al. | 370/252 |
| 2012/0271902 A1* | 10/2012 | Baliga et al. | 709/209 |
| 2012/0287807 A1* | 11/2012 | Yamasaki et al. | 370/252 |

FOREIGN PATENT DOCUMENTS

| | | |
|---|---|---|
| JP | 2007-174664 | 7/2007 |
| JP | 2009-500969 | 1/2009 |
| JP | 2009-124758 | 6/2009 |
| JP | 2009-153215 | 7/2009 |
| JP | 2009-159232 | 7/2009 |
| JP | 2009-159233 | 7/2009 |
| JP | 4506829 | 7/2010 |

OTHER PUBLICATIONS

International Search Report issued Feb. 28, 2012 in International (PCT) Application No. PCT/JP2012/000524.

* cited by examiner

WIRELESS COMMUNICATION APPARATUS SELECTING ONE OF DIRECT COMMUNICATION PATH AND INDIRECT COMMUNICATION PATH VIA ACCESS POINT APPARATUS

This is a continuation application of International application No. PCT/JP2012/000524 as filed on Jan. 27, 2012, which claims priority to Japanese patent application No. JP 2011-030478 as filed on Feb. 16, 2011, the contents of which are incorporated herein by reference.

BACKGROUND OF THE INVENTION

1. Field of the Invention

The present invention relates to a wireless communication apparatus of a first wireless communication apparatus for use in a wireless communication system including first and second wireless communication apparatuses and an access point apparatus, and relates to the access point apparatus and the wireless communication system. In particular, the present invention relates to a wireless communication apparatus of the first wireless communication apparatus that selects one communication path from among a direct communication path from the first wireless communication apparatus to the second wireless communication apparatus and an indirect communication path from the first wireless communication apparatus to the second wireless communication apparatus via the access point apparatus, and relates to the access point apparatus and the wireless communication system.

2. Description of the Related Art

BACKGROUND ART

In recent years, wireless LAN (Local Area Network) standards such as IEEE 802.11a or IEEE 802.11g have been established. Network configurations complying with the wireless LAN standards as described above include networks of an infrastructure mode and networks of an ad-hoc mode. In this case, the network of the infrastructure mode includes an access point apparatus (so called a base station) and a plurality of wireless communication apparatuses within a coverage of radio waves from the access point apparatus, and the access point apparatus arbitrates among access timings of the wireless communication apparatuses. In addition, the network of the ad-hoc mode does not need the above-described access point apparatus, and the wireless communication apparatuses determine access timings thereof.

Communications via the access point apparatus in the infrastructure mode have such a disadvantage that the throughput decreases as compared with that of the communications in the ad-hoc mode, however, have such an advantage that the wireless communication apparatuses within the coverage of the radio waves from the access point apparatus can be connected to a wired LAN and the Internet via the access point apparatus. In addition, the communications in the ad-hoc mode have no overhead due to relay by the access point apparatus since the wireless communication apparatuses directly communicate with one another, and have a more increased throughput than that of the communications in the infrastructure mode. On the other hand, the communications in the ad-hoc mode have such a disadvantage that the wireless communication apparatuses cannot be connected to the wired LAN and the Internet.

As a system that can utilize the advantages of both of the infrastructure mode and the ad-hoc mode, communications in a direct communication system (Direct Link Protocol (DLP) system) is defined as an optional function of IEEE 802.11e standard. According to the direct communication system, one wireless communication apparatus confirms whether or not another communication apparatus supports direct communications not via the access point apparatus, by a communication via the access point apparatus. When another wireless communication apparatus supports direct communications, the above-described one wireless communication apparatus communicates with another wireless communication apparatus directly.

For example, each of prior art wireless communication systems described in the Patent Documents 1 and 2 includes a first wireless communication apparatus, a second wireless communication apparatus, and a base station that relays wireless communications between the first and second wireless communication apparatuses. In this case, the first and second wireless communication apparatuses perform either an indirect communication via the base station or a direct communication not via the base station. In addition, the first wireless communication apparatus acquires kinds of communication functions that the second wireless communication apparatus supports, transmits a data frame by utilizing the communication functions that the first wireless communication apparatus, the second wireless communication apparatus and the base station support, and directly transmits a data frame to the second wireless communication apparatus by utilizing the communication function that the first and second wireless communication apparatuses support and the base station does not support. In addition, the base station transmits the data frame received from the first wireless communication apparatus to the second wireless communication apparatus, and the second wireless communication apparatus measures communication qualities of both of the data frame received from the first wireless communication apparatus and the data frame received from the base station for each utilized communication function. Then, the first wireless communication apparatus or the second wireless communication apparatus judges which of the indirect communication and the direct communication is to be performed, based on the communication qualities.

Prior art documents related to the present invention are listed below:

Patent Document 1: Japanese Patent Laid-open Publication No. JP 2009-159233 A;
Patent Document 2: Japanese Patent No. 4506829 B2;
Patent Document 3: Japanese Patent Laid-open Publication No. JP 2009-159232 A;
Patent Document 4: Japanese Patent Laid-open Publication No. JP 2006-025335 A;
Patent Document 5: U.S. Patent Application Publication No. US 2008/0045147 A1;
Patent Document 6: U.S. Patent Application Publication No. US 2009/0168736 A1; and
Patent Document 7: U.S. Patent Application Publication No. US 2009/0168689 A1.

In the above-described prior art wireless communication system, when transmitting a data frame to the second wireless communication apparatus, the first wireless communication apparatus selects one of the direct communication and the indirect communication, based on the communication quality of the data frame received by the second wireless communication apparatus from the base station and the communication quality of the data frame received by the second wireless communication apparatus directly from the first wireless communication apparatus. Therefore, when the transmission power of the base station is much larger than the transmission power of each of the first and second wireless communication apparatuses, the communication quality of the data frame received by the second wireless communication apparatus from the base station becomes higher than the communication quality of the data frame received by the second wireless communication apparatus directly from the first wireless communication apparatus. Therefore, the first wireless communication apparatus selects the indirect communication.

However, the transmission power of the first wireless communication apparatus is much smaller than the transmission power of the base station, and therefore, the communication quality of the data frame that the base station receives from the first wireless communication apparatus is lower than the communication quality of the data frame received by the second wireless communication apparatus from the base station. Therefore, in practice, it is sometimes the case where the communication quality of the indirect communication path from the first wireless communication apparatus to the second wireless communication apparatus via the base station becomes lower than the communication quality of the direct communication path from the first wireless communication apparatus to the second wireless communication apparatus. The prior art wireless communication system has been unable to appropriately select the communication path in such a case.

SUMMARY OF THE INVENTION

It is an object of the present invention to provide a wireless communication apparatus, an access point apparatus and a wireless communication system including first and second wireless communication apparatuses and the access point apparatus, each capable of solving the above-described problems and capable of selecting one communication path, from among a direct communication path from the first wireless communication apparatus to the second wireless communication apparatus, and an indirect communication path from the first wireless communication apparatus to the second wireless communication apparatus via the access point apparatus, in a more appropriate manner than that in the prior art.

A wireless communication apparatus according to a first invention is a first wireless communication apparatus for use in a wireless communication system which includes first and second wireless communication apparatuses and an access point apparatus. The access point apparatus is wirelessly connected to the first and second wireless communication apparatuses and, wirelessly transmits a wireless signal from the first wireless communication apparatus to the second wireless communication apparatus by relaying the wireless signal. The first wireless communication apparatus includes a path selecting part and a table memory. The path selecting part selects one of a direct communication path from the first wireless communication apparatus to the second wireless communication apparatus and an indirect communication path including a first communication path from the first wireless communication apparatus to the access point apparatus and a second communication path from the access point apparatus to the second wireless communication apparatus. The table memory previously stores a communication performance table for direct communication representing a relation between a communication quality and a communication performance of the direct communication path, and a communication performance table for indirect communication representing a relation between a communication quality and a communication performance of the indirect communication path. The path selecting part acquires a first communication quality of the first communication path, a second communication quality of the second communication path, and a communication quality of the direct communication path. The path selecting part acquires the communication performance of the direct communication path with reference to the communication performance table for direct communication based on the communication quality of the direct communication path. The path selecting part acquires the communication performance of the indirect communication path with reference to the communication performance table for indirect communication by using a lower communication quality selected from the first and second communication qualities as the communication quality of the indirect communication path. The path selecting part selects a communication path having a higher one of the communication performances of the direct and indirect communication paths.

In the above-described wireless communication apparatus, the path selecting part preferably transmits a predetermined first communication quality measurement request signal to the access point apparatus. The path selecting part preferably acquires the communication quality of the first communication path by receiving a first wireless control signal from the access point apparatus, the first wireless control signal being transmitted from the access point apparatus to the first and second wireless communication apparatuses in response to the first communication quality measurement request signal, and the first wireless control signal including a communication quality when the access point apparatus receives the first communication quality measurement request signal. The path selecting part preferably acquires the communication quality of the second communication path by receiving a second wireless control signal from the second wireless communication apparatus, the second wireless control signal being transmitted from the second wireless communication apparatus in response to the first wireless control signal, and the second wireless control signal including a communication quality when the second wireless communication apparatus receives the first wireless control signal.

In addition, in the above-described wireless communication apparatus, the path selecting part preferably transmits a predetermined second communication quality measurement request signal to the second wireless communication apparatus. The path selecting part preferably acquires the communication quality of the direct communication path by receiving a third wireless control signal from the second wireless communication apparatus, the third wireless control signal being transmitted from the second wireless communication apparatus in response to the second communication quality measurement request signal, and the third wireless control signal including the communication quality when the second wireless communication apparatus receives the second communication quality measurement request signal.

Further, in the above-described wireless communication apparatus, the communication performance is preferably throughput.

Still further, in the above-described wireless communication apparatus, the path selecting part preferably intermittently selects one of the direct communication path and the indirect communication path.

An access point apparatus according to a second invention is an access point apparatus for use in a wireless communication system which includes first and second wireless communication apparatuses and an access point apparatus. The access point apparatus is wirelessly connected to the first and second wireless communication apparatuses, and wirelessly transmits a wireless signal from the first wireless communication apparatus to the second wireless communication apparatus by relaying the wireless signal. In response to a predetermined first communication quality measurement request signal, the access point apparatus measures a communication quality of the first communication quality measurement request signal, and transmits a wireless control signal including the measured communication quality to the first and second wireless communication apparatuses.

A wireless communication system according to a third invention is a wireless communication system including the above-described first and second wireless communication apparatuses, and the above-described access point apparatus.

According to the wireless communication apparatus and the wireless communication system of the present invention, the wireless communication apparatus includes a path selecting part. The path selecting part acquires a first communication quality of the first communication path, a second communication quality of the second communication path, and a communication quality of the direct communication path. In addition, the path selecting part acquires the communication performance of the direct communication path with reference to the communication performance table for direct communication based on the communication quality of the direct communication path. Further, the path selecting part acquires the communication performance of the indirect communication path with reference to the communication performance table for indirect communication by using a lower communication quality selected from the first and second communication qualities as the communication quality of the indirect communication path. Finally the path selecting part selects a communication path having a higher one of the communication performances of the direct and indirect communication paths. Therefore, one of the direct communication path and the indirect communication path can be selected in a more appropriate manner than that in the prior art.

According to the access point apparatus of the present invention, in response to a predetermined first communication quality measurement request signal, the access point apparatus measures a communication quality of the first communication quality measurement request signal, and transmits a wireless control signal including the measured communication quality to the first and second wireless communication apparatuses. Therefore, in the first wireless communication apparatus, one of the direct communication path and the indirect communication path can be selected in more appropriate manner than that in the prior art.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Preferred embodiments of the present invention will be described hereinafter with reference to the drawings. In the preferred embodiments, components similar to each other are denoted by the same reference numerals.

Figure 1:
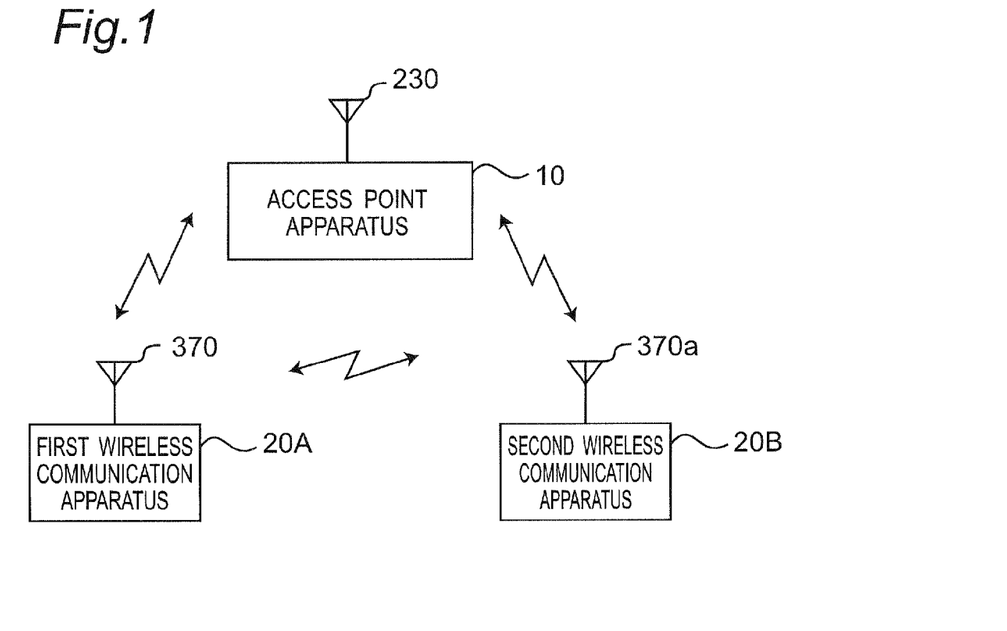
FIG. 1 is a block diagram showing a configuration of a wireless communication system according to a preferred embodiment of the present invention.
Figure 2:
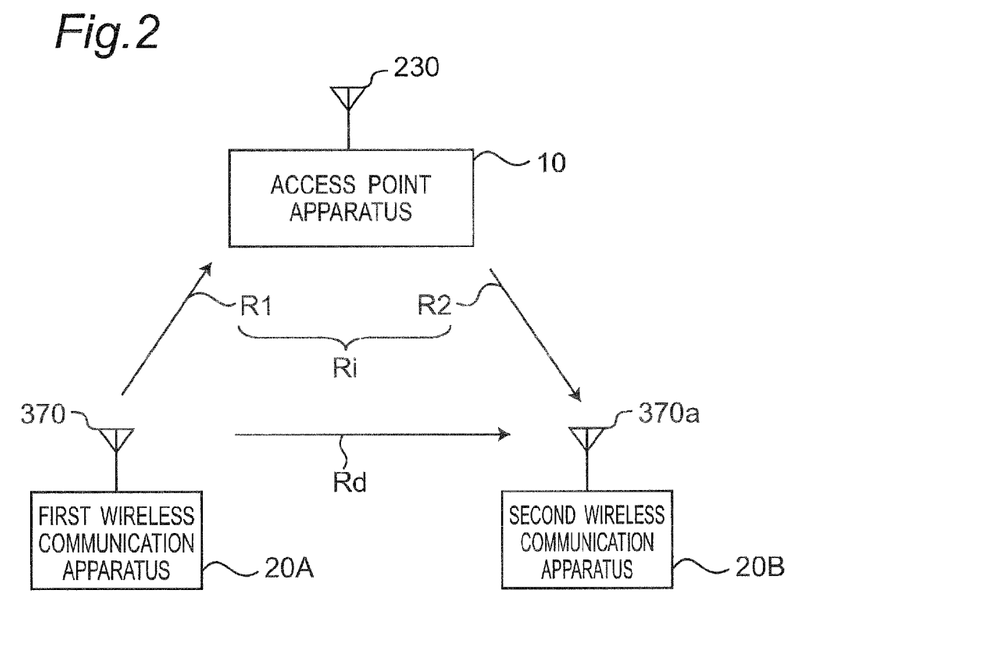
FIG. 2 is a block diagram showing a direct communication path Rd and an indirect communication path Ri between a first wireless communication apparatus 20A and a second wireless communication apparatus 20B of FIG. 1.
Figure 3:
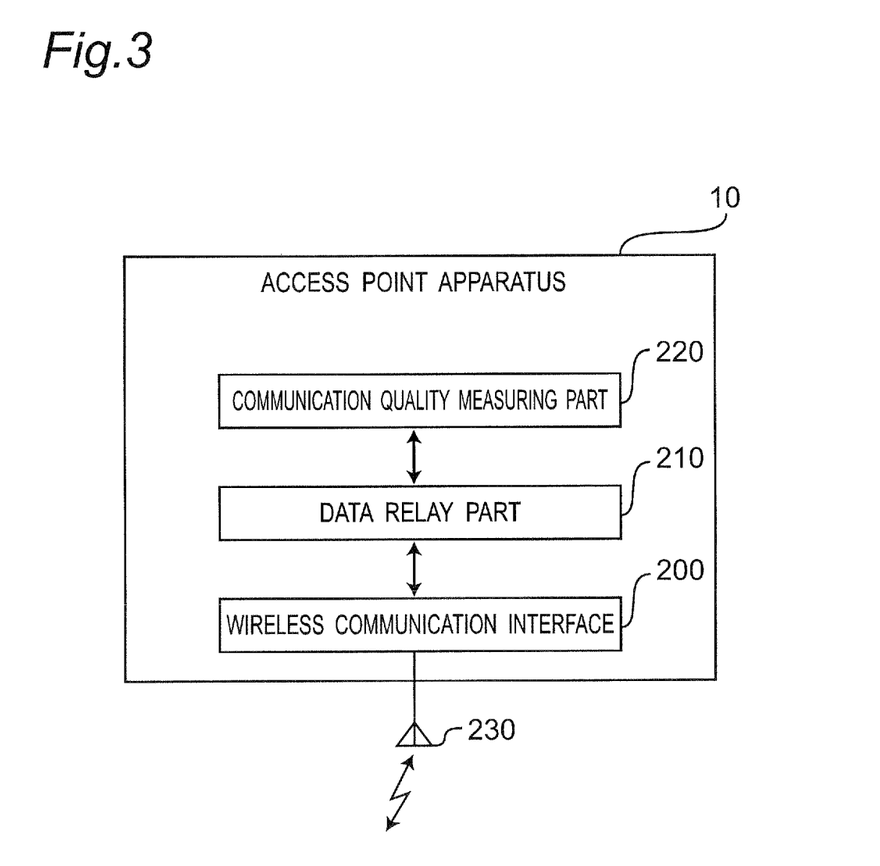
FIG. 3 is a block diagram showing a configuration of an access point apparatus 10 of FIG. 1.
Figure 4:
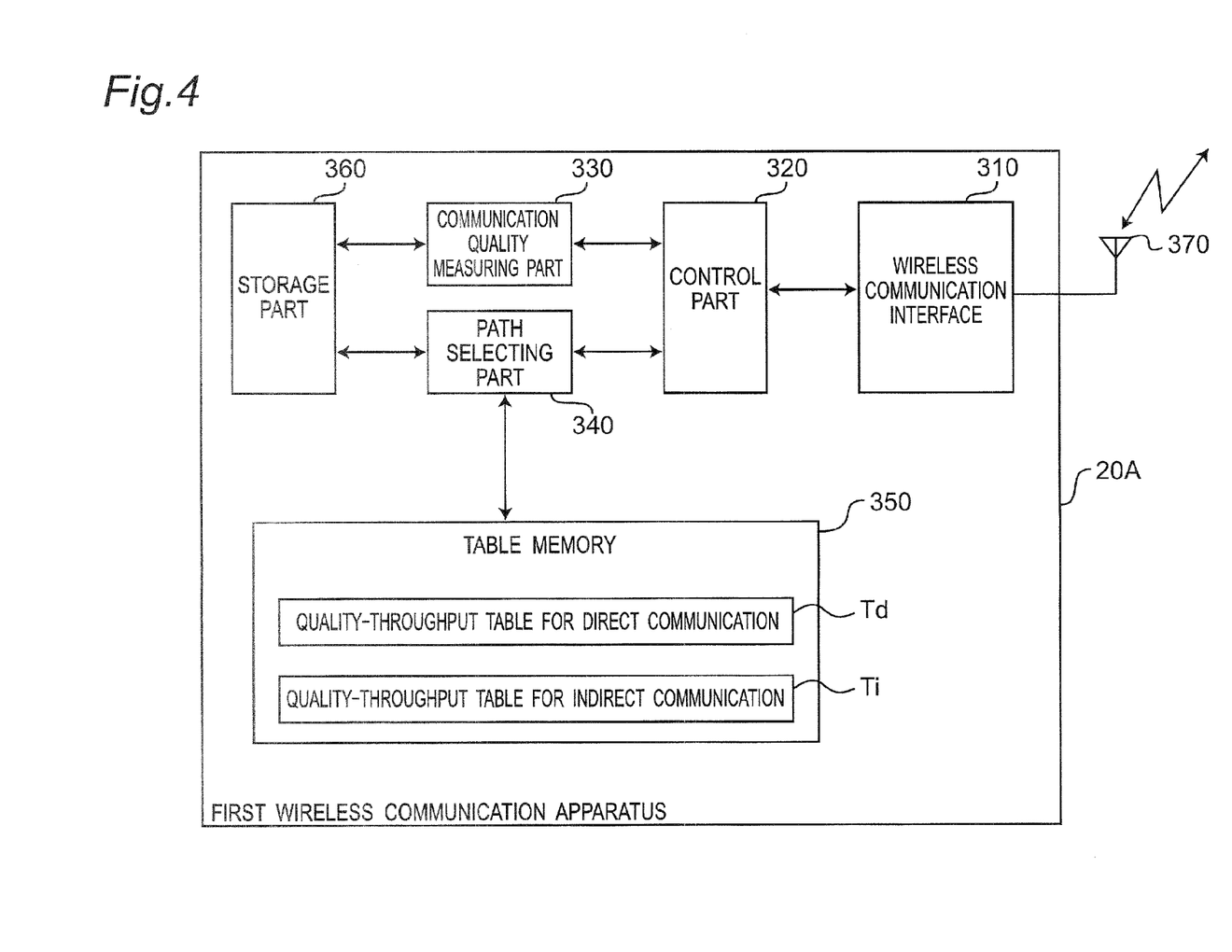
FIG. 4 is a block diagram showing a configuration of the first wireless communication apparatus 20A of FIG. 1.
Figure 5:
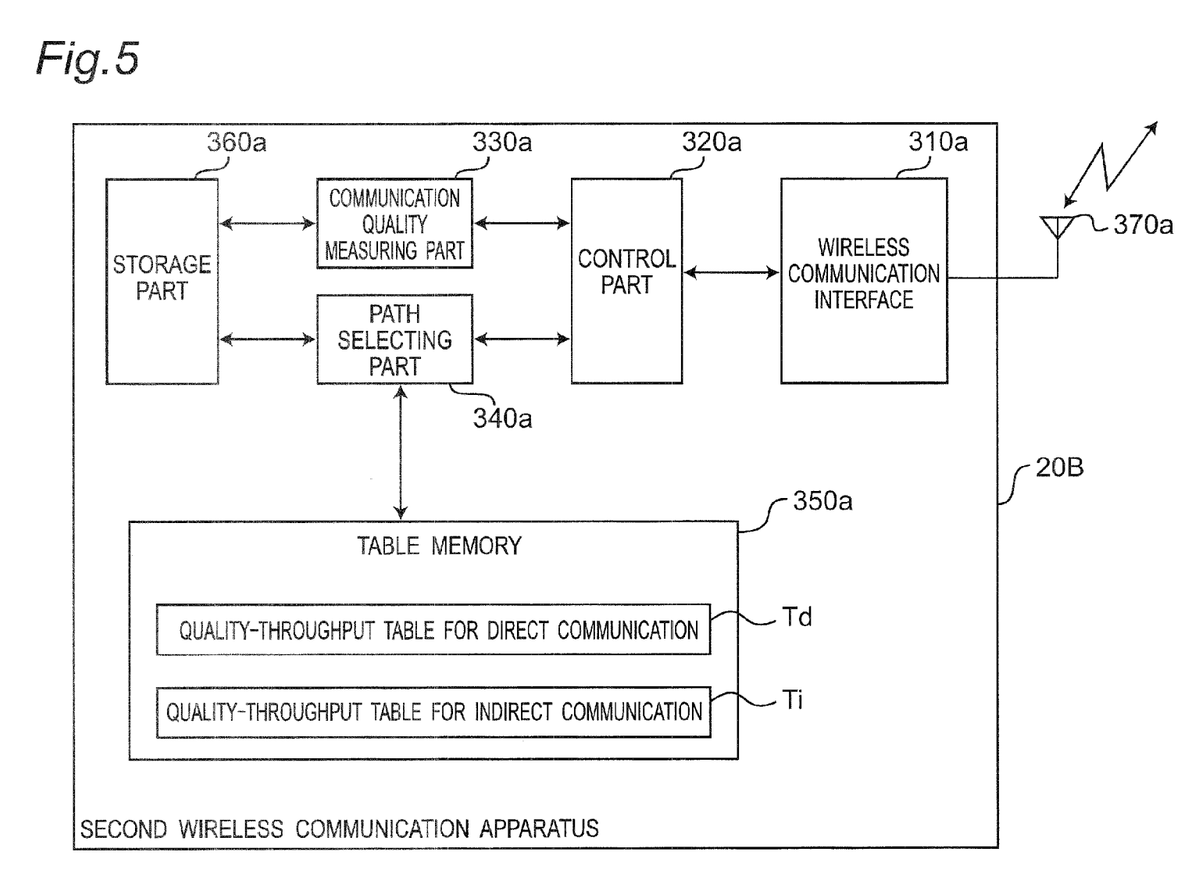
FIG. 5 is a block diagram showing a configuration of the second wireless communication apparatus 20B of FIG. 1.

FIG. 1 is a block diagram showing a configuration of a wireless communication system according to the preferred embodiment of the present invention, and FIG. 2 is a block diagram showing a direct communication path Rd and an indirect communication path Ri between a first wireless communication apparatus 20A and a second wireless communication apparatus 20B of FIG. 1. In addition, FIG. 3 is a block diagram showing a configuration of an access point apparatus 10 of FIG. 1, and FIG. 4 is a block diagram showing a configuration of the first wireless communication apparatus 20A of FIG. 1. FIG. 5 is a block diagram showing a configuration of the second wireless communication apparatus 20B of FIG. 1. Referring to FIG. 1, the wireless communication system of the present preferred embodiment is configured to include the first wireless communication apparatus 20A, the second wireless communication apparatus 20B, and the access point apparatus 10 that relays wireless signals transmitted and received between the first and second wireless communication apparatuses 20A and 20B.

Referring to FIG. 1, the access point apparatus 10, the first wireless communication apparatus 20A and the second wireless communication apparatus 20B have respective unique addresses, and wirelessly communicate with each other with designating the address of the other party to communicate.

Referring to FIG. 2, by executing a path selecting process of FIG. 7 described later in detail, the first wireless communication apparatus 20A selects one communication path, from among the direct communication path Rd from the first wireless communication apparatus 20A to the second wireless communication apparatus 20B, and the indirect communication path Ri from the first wireless communication apparatus 20A to the second wireless communication apparatus 20B via the access point apparatus 10. Then, the first wireless communication apparatus 20A transmits a wireless signal to the second wireless communication apparatus 20B via the selected communication path. In this case, as shown in FIG. 2, the indirect communication path Ri includes a communication path R1 from the first wireless communication apparatus 20A to the access point apparatus 10, and a communication path R2 from the access point apparatus 10 to the second wireless communication apparatus 20B.

Referring to FIG. 3, the access point apparatus 10 is configured to include a wireless communication interface 200, a data relay part 210, and a communication quality measuring part (wireless communication measuring part) 220. The wireless communication interface 200 is a wireless communication circuit which is configured to include an antenna 230, and is a device complying with the wireless LAN standard of IEEE 802.11, for example. The wireless communication interface 200 is wirelessly connected to a wireless communication interface 310 (See FIG. 4) of the first wireless communication apparatus 20A and a wireless communication interface 310a (See FIG. 5) of the second wireless communication apparatus 20B. The wireless communication interface 200 performs a predetermined interfacing process on wireless signals wirelessly transmitted from the wireless communication interfaces 310 and 310a to output a resultant signal to the data relay part 210. On the other hand, the wireless communication interface 200 performs a predetermined interfacing process on a wireless signal from the data relay part 210 to wirelessly transmit a resultant signal to at least one of the wireless communication interfaces 310 and 310a via the antenna 230.

In addition, referring to FIG. 3, the data relay part 210 is configured to include a control apparatus such as a CPU (Central Processing Unit), and relays the wireless signal received by the wireless communication interface 200, based on a destination address stored in a header of the wireless signal. In addition, when the received wireless signal is a communication quality measurement request signal, the wireless signal is outputted to the communication quality measuring part 220.

In addition, referring to FIG. 3, the communication quality measuring part 220 is configured to include a control apparatus such as a CPU. Upon receiving a wireless signal of the communication quality measurement request signal via the data relay part 210, the communication quality measuring part 220 measures communication quality of the received wireless signal, and transmits a wireless signal including measured communication quality to a wireless communication apparatus of the sender of the received wireless signal, via the data relay part 210 and the wireless communication interface 200. Concretely speaking, the communication quality measuring part 220 measures the RSSI (Received Signal Strength Indication) of the received wireless signal as the communication quality thereof, based on a level of an intermediate frequency signal of the received wireless signal.

Next, referring to FIG. 4, the first wireless communication apparatus 20A is configured to include the wireless communication interface 310, a control part 320, a communication quality measuring part 330, a path selecting part 340, a table memory 350, and a storage part 360. In this case, the wireless communication interface 310 is a wireless communication circuit which is configured to include an antenna 370, and is a device complying with the wireless LAN standard of IEEE 802.11, for example. The wireless communication interface 310 is wirelessly connected to the wireless communication interface 200 (See FIG. 3) of the access point apparatus 10 and the wireless communication interface 310a (See FIG. 5) of the second wireless communication apparatus 20B. The wireless communication interface 310 performs a predetermined interfacing process on wireless signals wirelessly transmitted from the wireless communication interfaces 200 and 310a to output a resultant signal to the control part 320. On the other hand, the wireless communication interface 310 performs a predetermined interfacing process on a wireless signal from the control part 320 to wirelessly transmit a resultant signal to at least one of the wireless communication interfaces 200 and 310a via the antenna 370.

In addition, referring to FIG. 4, the control part 320 is configured to include a control apparatus such as a CPU, and controls each part in the first wireless communication apparatus 20A. In addition, the control part 320 generates signals to be transmitted to the access point apparatus 10 and the second wireless communication apparatus 20B, and wirelessly transmit the same signals via the wireless communication interface 310. On the other hand, the control part 320 performs a predetermined process on wireless signals received from the access point apparatus 10 and the second wireless communication apparatus 20B.

Further, referring to FIG. 4, the communication quality measuring part 330 is configured to include a control apparatus such as a CPU, and receives the wireless signal received by the wireless communication interface 310 via the control part 320. Then, the communication quality measuring part 330 measures communication quality of the received wireless signal, stores measured communication quality into the storage part 360, and outputs the same communication quality to the control part 320. Concretely speaking, the communication quality measuring part 330 measures the RSSI of the received wireless signal as the communication quality thereof based on a level of an intermediate frequency signal of the received wireless signal.

In addition, the storage part 360 is a storage medium of a nonvolatile memory such as EEPROM (Electrically Erasable Programmable Read-Only Memory) or EPROM (Erasable Programmable Read Only Memory), a magnetic disk such as a hard disk or a discus-shaped magnetic disk, an optical disc such as CD-R (Compact Disc Recordable)/RW (ReWritable), DVD-R (Digital Versatile Disc Recordable)/RW/+R/+RW/RAM (Random Access Memory), and BD (Blu-Ray Disc (registered trademark)–R/BD–RE or MO (Magneto Optical) disk. The storage part 360 has a function to store various kinds of data. The storage part 360 stores the communication quality measured by the communication quality measuring part 330.

Figure 6:
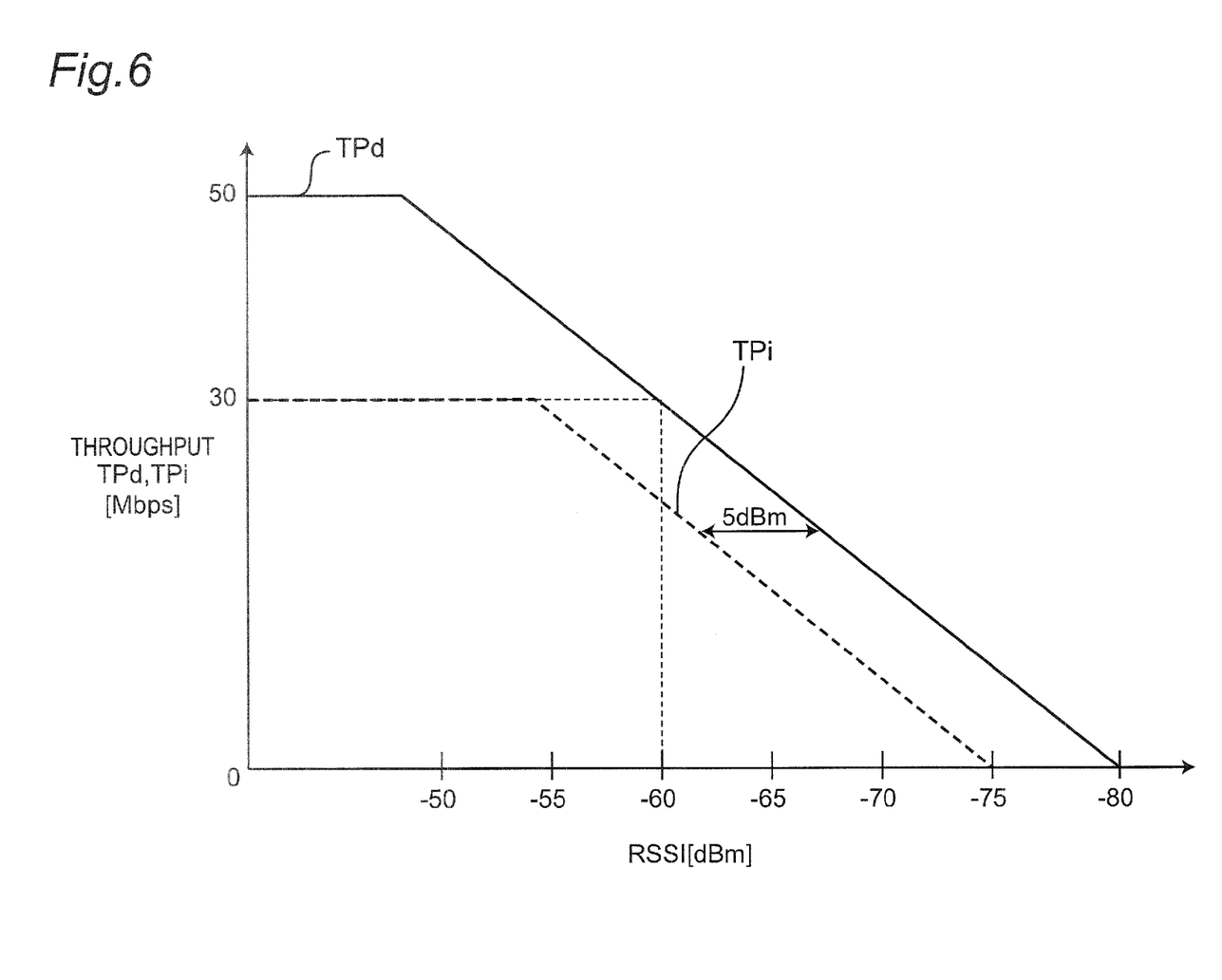
FIG. 6 is a graph showing one example of a relation between RSSI and throughput corresponding to a quality-throughput table Td for direct communication of FIG. 4, and a graph showing one example of a relation between RSSI and throughput corresponding to a quality-throughput table Ti for indirect communication.

Further, the table memory 350 is a storage medium similar to the storage part 360, and previously stores a quality-throughput table Td for direct communication (communication performance table for direct communication) and a quality-throughput table Ti for indirect communication (communication performance table for indirect communication). FIG. 6 is a graph showing one example of a relation between RSSI and throughput corresponding to the quality-throughput table Td for direct communication of FIG. 4 and a graph showing one example of a relation between RSSI and throughput corresponding to the quality-throughput table Ti for indirect communication. Referring to FIG. 6, the quality-throughput table Td for direct communication represents a relation between RSSI and a throughput TPd for communications in a direct communication mode for performing direct wireless communications between the first wireless communication apparatus 20A and the second wireless communication apparatus 20B. In addition, the quality-throughput table Ti for indirect communication represents a relation between RSSI and a throughput TPd for communications in an infrastructure mode for performing wireless communications between the first wireless communication apparatus 20A and the second wireless communication apparatus 20B via the access point apparatus 10. The data of the tables Td and Ti have been measured preliminarily and stored in the table memory 350.

It can be understood from the graph corresponding to the quality-throughput table Ti for indirect communication of FIG. 6 that the maximum throughput of the communications in the infrastructure mode via the indirect communication path Ri is 30 Mbps. In addition, it can be understood from the graph corresponding to the quality-throughput table Td for direct communication that the maximum throughput of communications in the direct communication mode via the direct communication path Rd is 50 MBps. It is noted that the throughput TPd represents the communication performance of the direct communication path Rd, and the throughput TPi represents the communication performance of the indirect communication path Ri.

Figure 7:
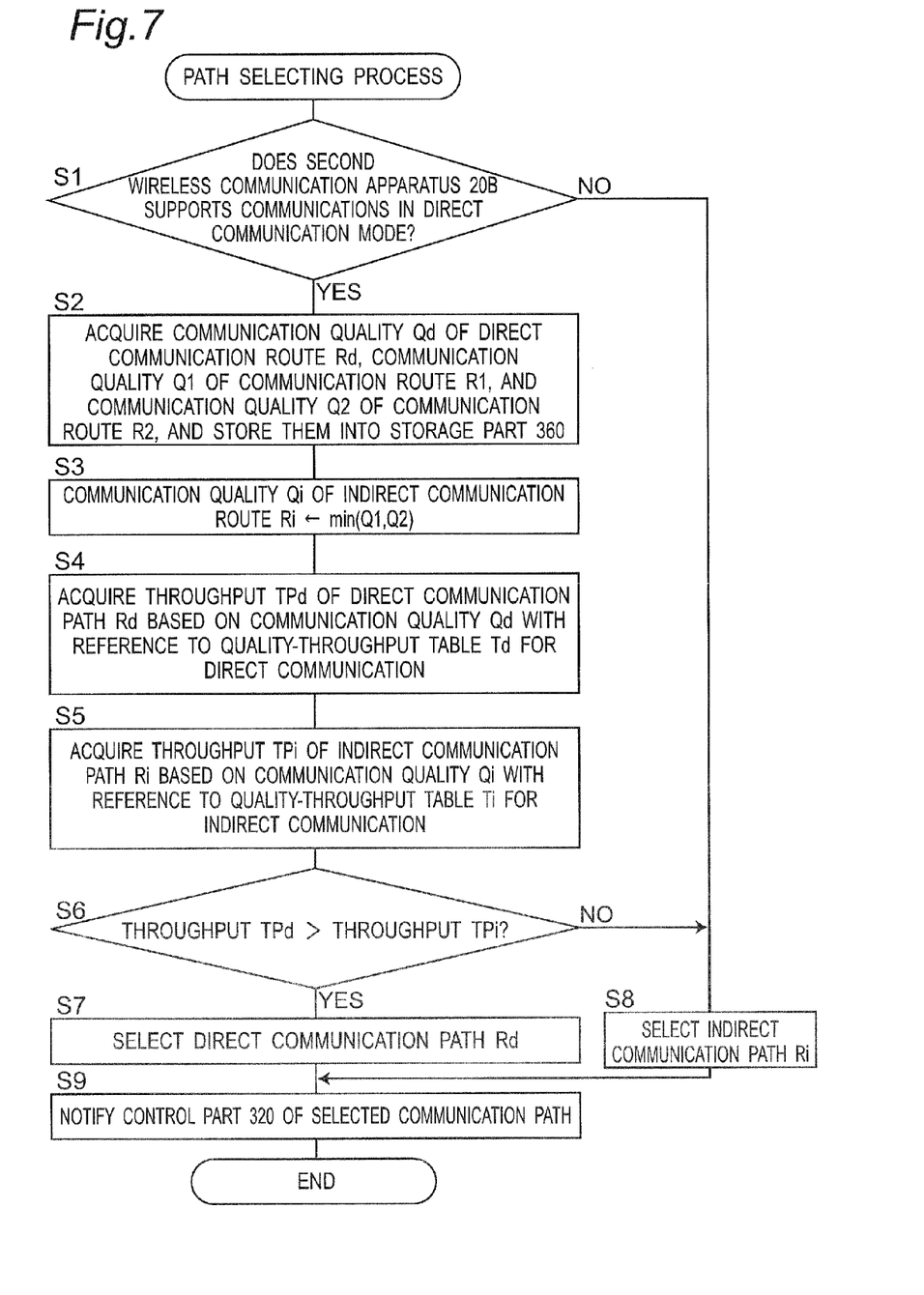
FIG. 7 is a flow chart showing a path selecting process executed by a path selecting part 340 of FIG. 4.

Referring to FIG. 4, the control section 320 controls the path selecting part 340 to intermittently and repetitively execute the path selecting process of FIG. 7 in a predetermined time cycle from the start of communication with the second wireless communication apparatus 20B (i.e., when wireless communication between the first wireless communication apparatus 20A and the second wireless communication apparatus 20B is established) to the end of communication. The path selecting part 340 intermittently and repetitively execute the path selecting process of FIG. 7 in the predetermined time cycle according to an instruction from the control part 320, and notifies the control part 320 of selecting the indirect communication path Ri or the direct communication path Rd every time of execution. In response to this, the control part 320 controls the respective parts of the wireless communication apparatus 20A to transmit a wireless signal to the second wireless communication apparatus 20B via the communication path notified from the path selecting part 340.

Referring to FIG. 5, the second wireless communication apparatus 20B is configured to include the wireless communication interface 310a, a control part 320a, a communication quality measuring part 330a, a path selecting part 340a, a table memory 350a and a storage part 360a. In this case, the wireless communication interface 310a, the control part 320a, the communication quality measuring part 330a, the path selecting part 340a, the table memory 350a and the storage part 360a are configured in manners similar to the wireless communication interface 310, the control part 320, the communication quality measuring part 330, the path selecting part 340, the table memory 350 and the storage part 360 of the first wireless communication apparatus 20A, respectively, and therefore, no description is provided for them.

Although the path selecting part 340 performs wireless communications via the control part 320 and the wireless communication interface 310, descriptions of the control part 320 and the wireless communication interface 310 are omitted below. In addition, although the path selecting part 340a performs wireless communications via the control part 320a and the wireless communication interface 310a, descriptions of the control part 320a and the wireless communication interface 310a are omitted below. In addition, although the communication quality measuring part 220 performs wireless communications via the data relay part 210 and the wireless communication interface 200, descriptions of the data relay part 210 and the wireless communication interface 200 are omitted below.

The path selecting process executed by the path selecting part 340 is described next with reference to FIG. 7. First of all, the path selecting part 340 judges at step S1 whether or not the second wireless communication apparatus 20B supports communications in the direct communication mode. Concretely speaking, the path selecting part 340 directly and wirelessly transmits a direct communication capability inquiry signal for inquiring whether or not the second wireless communication apparatus 20B supports the communications in the direct communication mode, to the second wireless communication apparatus 20B. In response to this, the second wireless communication apparatus 20B directly and wirelessly transmits a direct communication capability response signal representing whether or not the second wireless communication apparatus 20B supports communications in the direct communication mode, to the first wireless communication apparatus 20A. The path selecting part 340 judges whether or not the second wireless communication apparatus 20B supports the communications in the direct communication mode based on the direct communication capability response signal. At step S1, the path selecting part 340 may transmit and receive at least one of the direct communication capability inquiry signal and the direct communication capability response signal, via the access point apparatus 10.

If YES at step S1, then the control flow goes to step S2. On the other hand, if NO at step S1, then the control flow goes to step S8 to select the indirect communication path Ri, and goes to step S9. At step S2, the path selecting part 340 acquires a communication quality Qd of the direct communication path Rd, a communication quality Q1 of the communication path R1, and a communication quality Q2 of the communication path R2, and stores them into the storage part 360. The concrete process at step S2 is described later in detail with reference to FIG. 8. At step S3, the path selecting part 340 adopts as a communication quality Qi of the indirect communication path Ri, the lower communication quality selected from the communication quality Q1 of the communication path R1 and the communication quality Q2 of the communication path R2.

At step S4 subsequent to step S3, the path selecting part 340 acquires the throughput TPd of the direct communication path Rd based on the communication quality Qd with reference to the quality-throughput table Td for direct communication. Further, at step S5, the path selecting part 340 acquires the throughput TN of the indirect communication path Ri based on the communication quality Qi with reference to the quality-throughput table Ti for indirect communication. Subsequently, at step S6, the path selecting part 340 judges whether or not the throughput TPd is larger than the throughput TPi. If YES at step S6, then the control flow goes to step S7. On the other hand, if NO at step S6, then the control flow goes to step S8. Then, the direct communication path Rd is selected at step S7, and the control flow goes to step S9. At step S9, the path selecting part 340 notifies the control part 320 of the selected communication path, and ends the path selecting process.

Figure 8:
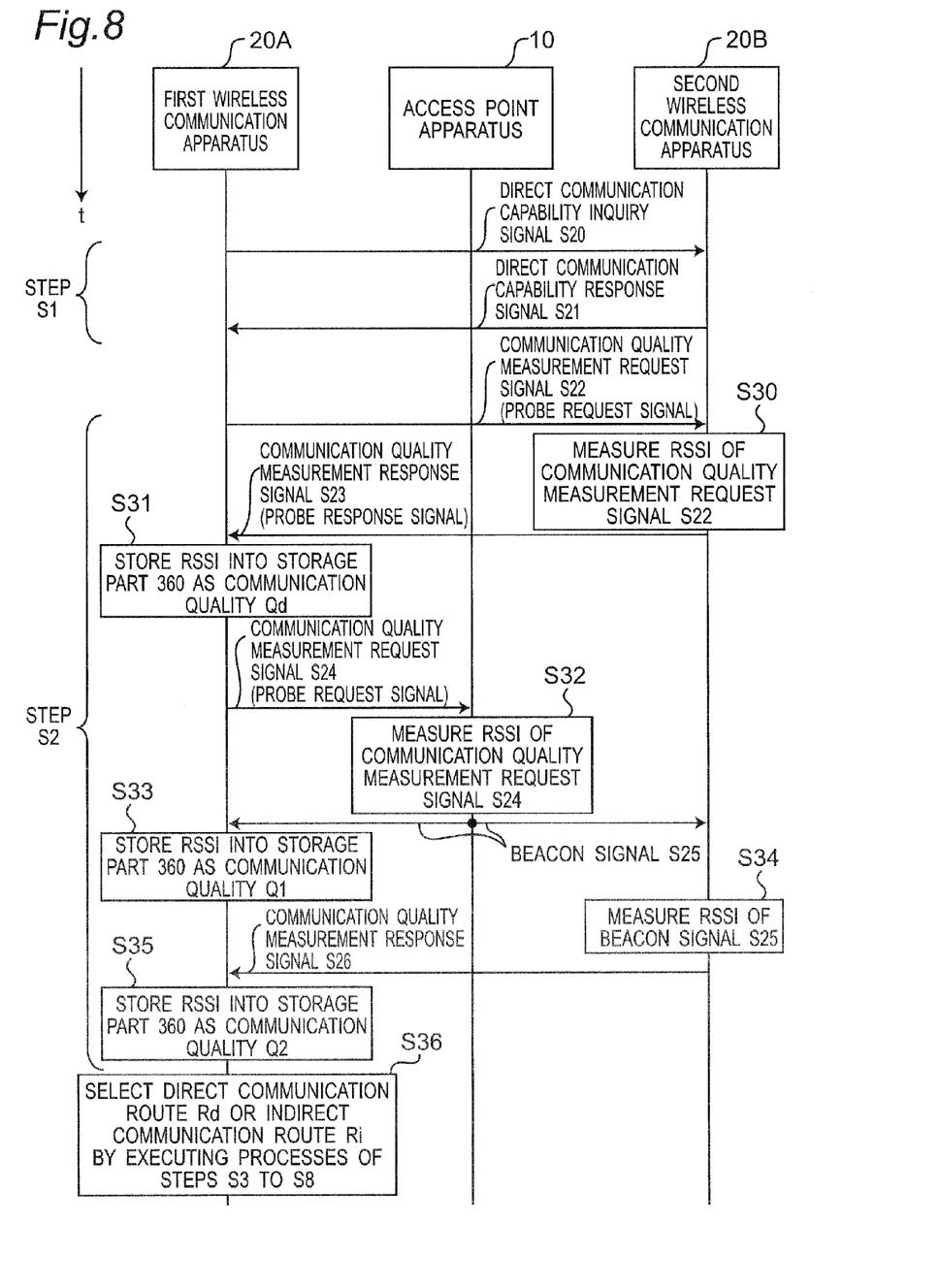
FIG. 8 is a timing chart showing a path selecting process executed by the wireless communication system of FIG. 1.

FIG. 8 is a timing chart showing a path selecting process executed by the wireless communication system of FIG. 1. Referring to FIG. 8, the second wireless communication apparatus 20B supports the communications in the direct communication mode. In addition, although the subject of the operations of the first wireless communication apparatus 20A of FIG. 8 is the path selecting part 340, it is merely described as the first wireless communication apparatus 20A below.

Referring to FIG. 8, the first wireless communication apparatus 20A directly and wirelessly transmits a direct communication capability inquiry signal S20 to the second wireless communication apparatus 20B by executing the process at step S1 of the path selecting process of FIG. 7. The control part 320a of the second wireless communication apparatus 20B receives the direct communication capability inquiry signal S20 via the wireless communication interface 310a, and directly and wirelessly transmits a direct communication capability response signal S21 representing that the second wireless communication apparatus 20B supports the communications in the direct communication mode, to the first wireless communication apparatus 20A via the wireless communication interface 310a. The first wireless communication apparatus 20A analyzes the direct communication capability response signal S21, and judges that the second wireless communication apparatus 20B supports the communications in the direct communication mode.

Subsequently, the first wireless communication apparatus 20A executes the process at step S2 of FIG. 7. Concretely speaking, referring to FIG. 8, the first wireless communication apparatus 20A wirelessly transmits a probe request signal (search request signal) complying with IEEE 802.11 standard to the second wireless communication apparatus 20B, as a communication quality measurement request signal S22. In the second wireless communication apparatus 20B, the communication quality measuring part 330a receives the communication quality measurement request signal S22 via the wireless communication interface 310a and the control part 320a. Then, at step S30, the communication quality measuring part 330a measures the RSSI when the communication quality measurement request signal S22 is received, and stores the RSSI into the storage part 360a. In addition, the communication quality measuring part 330a wirelessly transmits a probe response signal (search response signal), which complies with IEEE 802.11 standard and includes the measured RSSI, to the first wireless communication apparatus 20A, as a communication quality measurement response signal S23. In this case, the RSSI measured at step S30 corresponds to the communication quality Qd of the direct communication path Rd. Upon wirelessly receiving the communication quality measurement response signal S23, the first wireless communication apparatus 20A stores the RSSI included in the signal S23 into the storage part 360 as the communication quality Qd.

Subsequently, the first wireless communication apparatus 20A wirelessly transmits a probe request signal to the access point apparatus 10, as a communication quality measurement request signal S24 for requesting the access point apparatus 10 to measure communication quality when receiving the probe request signal and not to discard measured communication quality. In this case, the communication quality measurement request signal S24 includes the address of the second wireless communication apparatus 20B as an address of a destination apparatus. The data relay part 210 of the access point apparatus 10 receives the communication quality measurement request signal S24, and outputs the same signal to the communication quality measuring part 220. In response to this, the communication quality measuring part 220 measures the RSSI of the communication quality measurement request signal S24, and outputs the RSSI to the data relay part 210 (step S32). Further, the data relay part 210 wirelessly transmits a beacon signal S25 including the RSSI measured by the communication quality measuring part 220 and the communication quality measurement request signal S24. In this case, the RSSI measured at step S32 corresponds to the communication quality Q1 of the communication path R1. A beacon signal wirelessly transmitted at predetermined time intervals from the access point apparatus 10 may be used as the beacon signal S25. By using one beacon signal S25, the access point apparatus 10 can substantially relay the communication quality measurement request signal S24 to the second wireless communication apparatus 20B, and can notify the first wireless communication apparatus 20A of the RSSI measured at step S32.

Upon receiving the beacon signal S25, the first wireless communication apparatus 20A stores the RSSI included in the beacon signal S25 into the storage part 360 as the communication quality Q1 (step S33). On the other hand, upon receiving the beacon signal S25, the second wireless communication apparatus 20B measures the RSSI of the beacon signal S25, and stores the RSSI into the storage part 360a (step S34). In addition, the communication quality measuring part 330a wirelessly transmits a communication quality measurement response signal S26 including the measured RSSI, to the first wireless communication apparatus 20A. In this case, the RSSI measured at step S34 corresponds to the communication quality Q2 of the communication path R2. A probe response signal may be used as the communication quality measurement response signal S26.

Upon receiving the communication quality measurement response signal S26, the first wireless communication apparatus 20A stores the RSSI included in the signal S26 into the storage part 360 as the communication quality Q2 (step S35). Then, the first wireless communication apparatus 20A selects one of the direct communication path Rd and the indirect communication path Ri, by executing the processes at steps S3 to S8 of FIG. 7 using the communication qualities Qd, Q1 and Q2 stored in the storage part 360 (step S36).

For example, when the communication quality Q2 is higher than the communication quality Q1, the communication quality Qi of the indirect communication path Ri is set to the communication quality Q1. In the example shown in FIG. 6, in such a case where the communication quality Qd is higher than −60 dBm, the throughput TPd of the direct communication path Rd is larger than 30 Mbps. Since the maximum throughput of the indirect communication path Ri is 30 Mbps, the path selecting part 340 selects the direct communication path Rd when Qd>−60 dBm. In addition, as shown in FIG. 6, in such a case where the communication quality Qd is equal to or lower than −60 dBm, the throughput TPi of the indirect communication path Ri and the throughput TPd of the direct communication path Rd have the same values when the communication quality Qi is higher than the communication quality Qd by 5 dBm. Therefore, the path selecting part 340 selects the direct communication path Rd when Qd≥Qi−5 (dBm). In addition, when Qd<−60 dBm and Qd<Qi−5 (dBm), the path selecting part 340 selects the indirect communication path Ri, since the throughput TPi of the indirect communication path Ri becomes larger than the throughput TPd of the direct communication path Rd.

As described above, the first wireless communication apparatus includes the path selecting part 340 that selects one of the direct communication path Rd and the indirect communication path Ri, and the table memory 350 that previously stores the quality-throughput table Td for direct communication representing the relation between the communication quality Qd of the direct communication path Rd and the throughput TPd, and the quality-throughput table Ti for indirect communication representing the relation between the communication quality Qi of the indirect communication path Ri and the throughput TPi. In this case, the path selecting part 340 acquires the communication quality Q1 of the communication path R1, the communication quality Q2 of the communication path R2, and the communication quality Qd of the direct communication path Rd. The path selecting part 340 acquires the throughput TPd of the direct communication path Rd with reference to the quality-throughput table Td for direct communication based on the communication quality Qd of the direct communication path Rd. The path selecting part 340 acquires the throughput TPi of the indirect communication path Ri with reference to the quality-throughput table Ti for indirect communication, by using the lower communication quality selected from the communication qualities Q1 and Q2, as the communication quality Qi of the indirect communication path Ri. Then, the path selecting part 340 selects the communication path having a higher one of the throughput TPd of the direct communication path Rd and the throughput TPi of the indirect communication path Ri.

In addition, the path selecting part 340 transmits the communication quality measurement request signal S24 to the access point apparatus 10, and acquires the communication quality Q1 of the communication path R1 by receiving the beacon signal S25 from access point apparatus 10. In this case, the beacon signal S25 is transmitted from the access point apparatus 10 to the first and second wireless communication apparatuses 20A and 20B in response to the communication quality measurement request signal S24, and the beacon signal S25 includes the communication quality when the communication quality measurement request signal S24 is received by the access point apparatus 10. Further, the path selecting part 340 acquires the communication quality Q2 of the communication path R2 by receiving the communication quality measurement response signal S26 from the second wireless communication apparatus 20B. In this case, the communication quality measurement response signal S26 is transmitted from the second wireless communication apparatus 20B in response to the beacon signal S25, and the communication quality measurement response signal S26 includes the communication quality when the beacon signal S25 is received by the second wireless communication apparatus 20B. Still further, the path selecting part 340 transmits the communication quality measurement request signal S22 to the second wireless communication apparatus 20B, and acquires the communication quality Qd of the direct communication path Rd by receiving the communication quality measurement response signal S23 from the second wireless communication apparatus 20B. In this case, the communication quality measurement response signal S23 is transmitted from the second wireless communication apparatus 20B in response to the communication quality measurement request signal S22, and the communication quality measurement response signal S23 includes the communication quality when the communication quality measurement request signal S22 is received by the second wireless communication apparatus 20B.

Therefore, according to the present preferred embodiment, the path selecting part 340 uses the lower communication quality selected from the communication qualities Q1 and Q2, as the communication quality Qi of the indirect communication path Ri. Therefore, even when, for example, the transmission power of each of the first wireless communication apparatus 20A and the second wireless communication apparatus 20B is much smaller than the transmission power of the access point apparatus 10, the appropriate communication path of the direct communication path Rd and the indirect communication path Ri can be selected with accuracy higher than that of the prior art. Therefore, data can be wirelessly transmitted stably at high speed from the first wireless communication apparatus 20A to the second wireless communication apparatus 20B.

In addition, the first wireless communication apparatus 20A of the present preferred embodiment can be realized merely by adding the communication quality measuring part 330, the path selecting part 340 and the table memory 350 to a prior art wireless communication apparatus that can perform the communications in the direct communication mode not via the access point apparatus 10. Therefore, the present invention is particularly useful for storage apparatuses and AV stream supporting apparatuses, for which high-speed stable data transmission is demanded.

It is noted that the path selecting part 340a of the second wireless communication apparatus 20B executes a path selecting process similar to the path selecting process of FIG. 7 to select one communication path from among a direct communication path from the second wireless communication apparatus 20B to the first wireless communication apparatus 20A, and an indirect communication path from the second wireless communication apparatus 20B to the first wireless communication apparatus 20A via the access point apparatus 10. Therefore, when, for example, the transmission power of the first wireless communication apparatus 20A is much smaller than the transmission power of each of the access point apparatus 10 and the second wireless communication apparatus 20B, the communication path for transmitting a wireless signal from the first wireless communication apparatus 20A to the second wireless communication apparatus 20B is sometimes different from the communication path for transmitting a wireless signal from the second wireless communication apparatus 20B to the first wireless communication apparatus 20A.

Modified Preferred Embodiment

Figure 9:
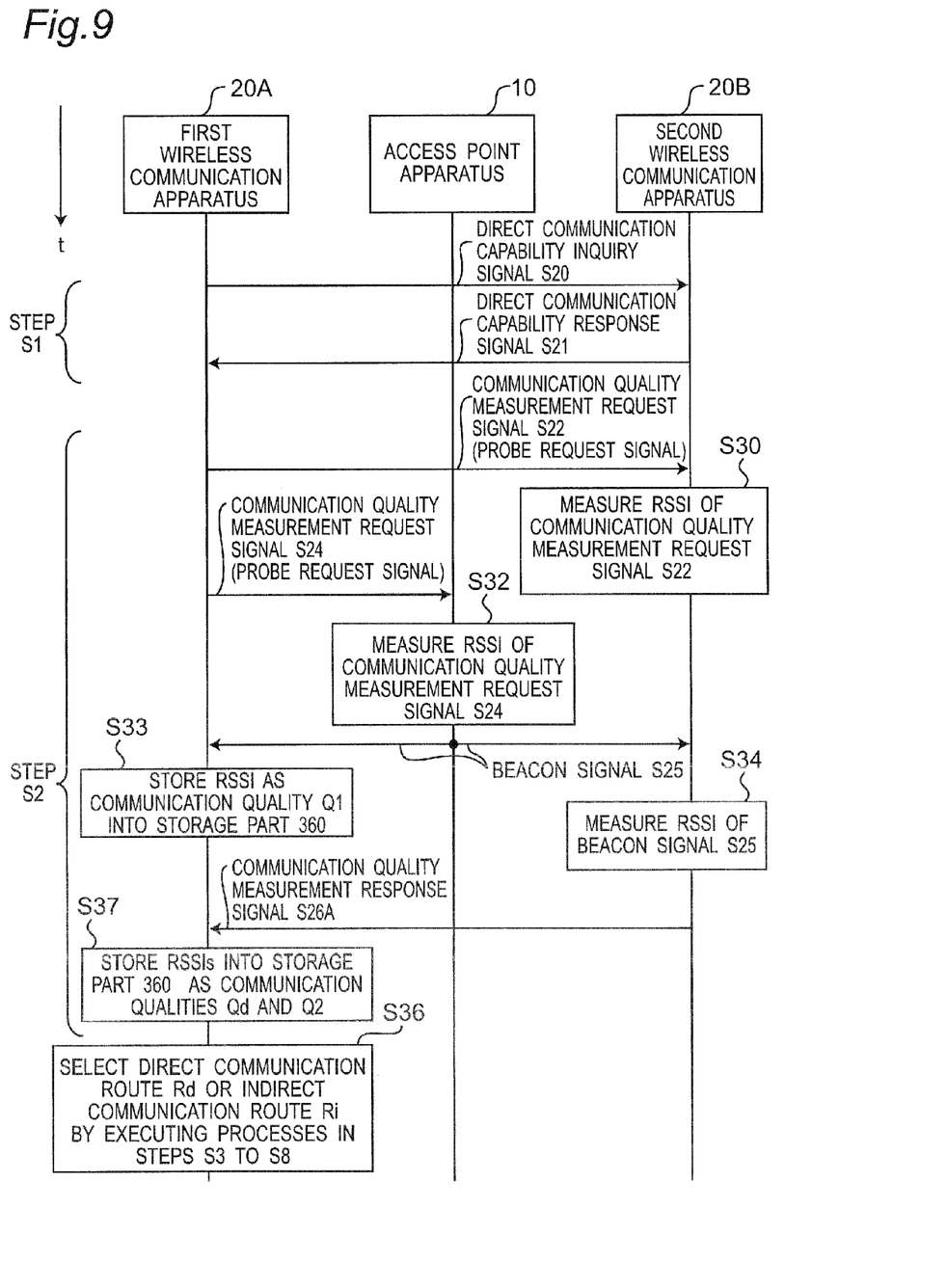
FIG. 9 is a timing chart showing a path selecting process according to a modified preferred embodiment executed by the wireless communication system of FIG. 1.

The concrete process at step S2 of FIG. 7 is not limited to the process shown in FIG. 8. FIG. 9 is a timing chart showing a path selecting process according to a modified preferred embodiment executed by the wireless communication system of FIG. 1. Referring to FIG. 9, only the points of difference from FIG. 8 are described. At step S30 of FIG. 9, the communication quality measuring part 330a of the second wireless communication apparatus 20b measures the RSSI of the communication quality measurement request signal S22 received from the first wireless communication apparatus 20A in response to the communication quality measurement request signal S22, and stores the RSSI into the storage part 360a. In this case, the second wireless communication apparatus 20B does not transmit the communication quality measurement response signal S23 to the first wireless communication apparatus 20A. Instead, at step S34, the second wireless communication apparatus 20B measures the RSSI of the beacon signal S25 and stores the RSSI into the storage part 360a, and thereafter, wirelessly transmits a communication quality measurement response signal S26A including the RSSI measured at step S30 and the RSSI measured at step S34, to the first wireless communication apparatus 20A. Then, upon receiving the communication quality measurement response signal S26A, the first wireless communication apparatus 20A stores the RSSIs included in the signal S26A as communication qualities Qd and Q2 into the storage part 360 (step S37). The present modified preferred embodiment exhibits advantageous effects similar to those of the above-described preferred embodiment.

In the above-described preferred embodiment and its modified preferred embodiment, the path selecting part 340 executes the path selecting process of FIG. 7 repetitively, however, the present invention is not limited to this. If NO at step S1 of FIG. 7, then the indirect communication path Ri may be selected without executing the path selecting process of FIG. 7 equal to or more than two times. In addition, if NO at step S1 of FIG. 7, then the process of step S1 may be skipped without executing step S1 when executing the path selecting process of FIG. 7 next time.

In addition, in the above-described preferred embodiment and its modified preferred embodiment, the two wireless communication apparatuses 20A and 20B are wirelessly connected to the access point apparatus 10, however, the present invention is not limited to this. A plurality of three or more wireless communication apparatuses may be wirelessly connected to the access point apparatus 10. In this case, the communication path between two wireless communication apparatuses selected from among the plurality of three or more wireless communication apparatuses can be selected by the path selecting process of FIG. 7.

Further, in the above-described preferred embodiment and its modified preferred embodiment, the communication quality measuring parts 220, 330 and 330a measure the RSSI of the received wireless signal as the communication quality thereof, however, the present invention is not limited to this.

The communication quality measuring parts 220, 330 and 330a may measure a parameter representing the communication quality of the wireless signal such as RCPI (Radio Channel Power Indicator) defined by IEEE 802.11k standard. In addition, in the above-described preferred embodiment and its modified preferred embodiment, the communication quality measuring part 220 measures the communication quality in response to the communication quality measurement request signal, however, the present invention is not limited to this. The communication quality measuring part 220 may measure communication quality always or in predetermined time cycles. Still further, in the above-described preferred embodiment and its modified preferred embodiment, the communication quality measuring part 220 is connected to the wireless communication interface 200 via the data relay part 210, however, the present invention is not limited to this. The communication quality measuring part 220 may be connected to the wireless communication interface 200 directly.

Still further, in the above-described preferred embodiment and its modified preferred embodiment, the control part 320 controls the path selecting part 340 to execute the path selecting process of FIG. 7 intermittently and repetitively in predetermined time cycles from the start of communication to the end of communication with the second wireless communication apparatus 20B, however, the present invention is not limited to this. The control part 320 may control the path selecting part 340 to execute the path selecting process of FIG. 7 at every timing of transmitting the wireless signal to the second wireless communication apparatus 20B. In addition, the control part 320 may control the path selecting part 340 to execute the path selecting process of FIG. 7 at predetermined time intervals.

In addition, in the above-described preferred embodiment and its modified preferred embodiment, the access point apparatus 10 wirelessly transmits the beacon signal S25 that includes the RSSI measured by the communication quality measuring part 220 and the predetermined command for requesting the second wireless communication apparatus 20B to measure the communication quality and to store the communication quality into the storage part 360a without discarding the communication quality, however, the present invention is not limited to this. The access point apparatus 10 may wirelessly transmit the beacon signal including the RSSI measured by the communication quality measuring part 220 and wirelessly transmit a predetermined test signal for measuring the communication quality to the second wireless communication apparatus 20B. In this case, the communication quality measuring part 330a of the second wireless communication apparatus 20B measures the RSSI of a received test signal, and wirelessly transmits the RSSI to the first wireless communication apparatus 20A.

Further, in the above-described preferred embodiment, the first wireless communication apparatus 20A acquires the communication quality Qd by receiving the communication quality measurement response signal S23 from the second wireless communication apparatus 20B, acquires the communication quality Q1 by receiving the beacon signal S25 from the access point apparatus 10, and acquires the communication quality Q2 by receiving the communication quality measurement response signal S26 from the second wireless communication apparatus 20B. In addition, in the above-described modified preferred embodiment, the first wireless communication apparatus 20A acquires the communication quality Q1 by receiving the beacon signal S25 from the access point apparatus 10, and acquires the communication qualities Qd and Q2 by receiving the communication quality measurement response signal S26A from the second communication apparatus 20B. In this case, the beacon signal S25 and the communication quality measurement response signals S23, S26 and S26A are wireless control signals, respectively.

However, the present invention is not limited to this. The first wireless communication apparatus 20A may acquire the communication quality Q1 by receiving a first wireless control signal from the access point apparatus 10 in place of the beacon signal S25. In this case the first wireless control signal is transmitted from the access point apparatus 10 to the wireless communication apparatuses 20A and 20B in response to the communication quality measurement request signal S24, and includes the communication quality when the communication quality measurement request signal S24 is received by the access point apparatus 10. In addition, the first wireless communication apparatus 20A may acquire the communication quality Q2 by receiving a predetermined second wireless control signal from the second wireless communication apparatus 20B in place of the communication quality measurement response signals S26 or S26A. In this case, the second wireless control signal is transmitted from the second wireless communication apparatus 20B in response to the above-described first wireless control signal, and includes the communication quality when the first wireless control signal is received by the second wireless communication apparatus 20B. In addition, the first wireless communication apparatus 20A may acquire the communication quality Qd by receiving a predetermined third wireless control signal from the second wireless communication apparatus 20B in place of the communication quality measurement response signals S23 or S26A. In this case, the third wireless control signal is transmitted from the second wireless communication apparatus 20B in response to the communication quality measurement request signal S22, and includes the communication quality when the communication quality measurement request signal S22 is received by the second wireless communication apparatus 20B.

Still further, the graph showing one example of the relation between RSSI and throughput corresponding to the quality-throughput table Td for direct communication and the graph showing one example of the relation between RSSI and throughput corresponding to the quality-throughput table Ti for indirect communication shown in FIG. 6 are mere examples, which do not limit the scope of the present invention.

In addition, in the above-described preferred embodiment and its modified preferred embodiment, the probe request signal and the probe response signal are used, however, the present invention is not limited to this. A search request signal similar to the probe request signal and a search response signal similar to the probe response signal may be used.

Further, in the above-described preferred embodiment and its modified preferred embodiment, the second wireless communication apparatus 20B is configured in a manner similar to that of the first wireless communication apparatus 20A, however, the present invention is not limited to this. When no wireless signal is transmitted from the second wireless communication apparatus 20B to the first wireless communication apparatus 20A, the second wireless communication apparatus 20B of FIG. 5 may not be provided with the path selecting part 340a and the table memory 350.

Still further, the present invention can be realized by not only, for example, the first wireless communication apparatus 20A, the second wireless communication apparatus 20B and the access point apparatus 10, but also a method including steps corresponding to the processes executed by the apparatuses 20A, 20B and 10. In addition, the present invention may be realized by a program characterized by including the steps of the above-described method, or a recording medium such as CD-ROM (Compact Disc-Read Only Memory) readable with a computer characterized by storing the program. In addition, the present invention may be realized by information, data or a signal that represents the program. Then, the program, information, data, and signal may be distributed via a communication network such as the Internet. In particular, the present invention may be realized by a program that includes the steps of the path selecting process of FIG. 7 or a recording medium readable with a computer that stores the program.

In addition, the first wireless communication apparatus 20A, the second wireless communication apparatus 20B and the access point apparatus 10 may be partially or totally configured by one system LSI (Large Scale Integration Circuit). The system LSI is a super-multi-function LSI produced by integrating a plurality of constituent elements on one chip, and in particular, it is a computer system configured by including a microprocessor, ROM, RAM, and so on.

INDUSTRIAL APPLICABILITY

As described above in detail, according to the wireless communication apparatus and the wireless communication system of the present invention, the wireless communication apparatus includes a path selecting part. The path selecting part acquires a first communication quality of the first communication path, a second communication quality of the second communication path, and a communication quality of the direct communication path. In addition, the path selecting part acquires the communication performance of the direct communication path with reference to the communication performance table for direct communication based on the communication quality of the direct communication path. Further, the path selecting part acquires the communication performance of the indirect communication path with reference to the communication performance table for indirect communication by using a lower communication quality selected from the first and second communication qualities as the communication quality of the indirect communication path. Finally the path selecting part selects a communication path having a higher one of the communication performances of the direct and indirect communication paths. Therefore, one of the direct communication path and the indirect communication path can be selected in a more appropriate manner than that in the prior art.

According to the access point apparatus of the present invention, in response to a predetermined first communication quality measurement request signal, the access point apparatus measures a communication quality of the first communication quality measurement request signal, and transmits a wireless control signal including the measured communication quality to the first and second wireless communication apparatuses. Therefore, in the first wireless communication apparatus, one of the direct communication path and the indirect communication path can be selected in more appropriate manner than that in the prior art.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A wireless communication apparatus that is a first wireless communication apparatus for use in a wireless communication system which comprises the first wireless communication apparatus, a second wireless communication apparatus, and an access point apparatus, the access point apparatus being wirelessly connected to the first and second wireless communication apparatuses and wirelessly transmitting a wireless signal from the first wireless communication apparatus to the second wireless communication apparatus by relaying the wireless signal, wherein the first wireless communication apparatus comprises:

a path selecting part that selects one of a direct communication path from the first wireless communication apparatus to the second wireless communication apparatus and an indirect communication path including a first communication path from the first wireless communication apparatus to the access point apparatus and a second communication path from the access point apparatus to the second wireless communication apparatus; and a table memory that previously stores a communication performance table for direct communication representing a relation between a communication quality and a communication performance of the direct communication path, and a communication performance table for indirect communication representing a relation between a communication quality and a communication performance of the indirect communication path, wherein the path selecting part acquires a first communication quality of the first communication path, a second communication quality of the second communication path, and a communication quality of the direct communication path, acquires the communication performance of the direct communication path with reference to the communication performance table for direct communication based on the communication quality of the direct communication path, acquires the communication performance of the indirect communication path with reference to the communication performance table for indirect communication by using a lower communication quality selected from the first and second communication qualities as the communication quality of the indirect communication path, selects a communication path having a higher one of the communication performances of the direct and indirect communication paths, transmits a predetermined first communication quality measurement request signal to the access point apparatus, acquires the first communication quality of the first communication path by receiving a first wireless control signal from the access point apparatus, the first wireless control signal being transmitted from the access point apparatus to the first and second wireless communication apparatuses in response to the predetermined first communication quality measurement request signal, and the first wireless control signal including a communication quality when the access point apparatus receives the predetermined first communication quality measurement request signal, and acquires the second communication quality of the second communication path by receiving a second wireless control signal from the second wireless communication apparatus, the second wireless control signal being transmitted from the second wireless communication apparatus in response to the first wireless control signal, and the second wireless control signal including a communication quality when the second wireless communication apparatus receives the first wireless control signal.

2. The wireless communication apparatus as claimed in claim 1,
wherein the path selecting part
transmits a predetermined second communication quality measurement request signal to the second wireless communication apparatus, and
acquires the communication quality of the direct communication path by receiving a third wireless control signal from the second wireless communication apparatus, the third wireless control signal being transmitted from the second wireless communication apparatus in response to the second communication quality measurement request signal, and the third wireless control signal including the communication quality when the second wireless communication apparatus receives the second communication quality measurement request signal.

3. The wireless communication apparatus as claimed in claim 1,
wherein the communication performance is throughput.

4. The wireless communication apparatus as claimed in claim 1,
wherein the path selecting part intermittently selects one of the direct communication path and the indirect communication path.

5. A wireless communication system comprising first and second wireless communication apparatuses and an access point apparatus, the access point apparatus being wirelessly connected to the first and second wireless communication apparatuses and wirelessly transmitting a wireless signal from the first wireless communication apparatus to the second wireless communication apparatus by relaying the wireless signal,
wherein the first wireless communication apparatus comprises:
a path selecting part that selects one of a direct communication path from the first wireless communication apparatus to the second wireless communication apparatus and an indirect communication path including a first communication path from the first wireless communication apparatus to the access point apparatus and a second communication path from the access point apparatus to the second wireless communication apparatus; and
a table memory that previously stores a communication performance table for direct communication representing a relation between a communication quality and a communication performance of the direct communication path, and a communication performance table for indirect communication representing a relation between a communication quality and a communication performance of the indirect communication path,
wherein the path selecting part
acquires a first communication quality of the first communication path, a second communication quality of the second communication path, and a communication quality of the direct communication path,
acquires the communication performance of the direct communication path with reference to the communication performance table for direct communication based on the communication quality of the direct communication path,
acquires the communication performance of the indirect communication path with reference to the communication performance table for indirect communication by using a lower communication quality selected from the first and second communication qualities as the communication quality of the indirect communication path,
selects a communication path having a higher one of the communication performances of the direct and indirect communication paths,
transmits a predetermined first communication quality measurement request signal to the access point apparatus,
acquires the first communication quality of the first communication path by receiving a first wireless control signal from the access point apparatus, the first wireless control signal being transmitted from the access point apparatus to the first and second wireless communication apparatuses in response to the predetermined first communication quality measurement request signal, and the first wireless control signal including a communication quality when the access point apparatus receives the predetermined first communication quality measurement request signal, and
acquires the second communication quality of the second communication path by receiving a second wireless control signal from the second wireless communication apparatus, the second wireless control signal being transmitted from the second wireless communication apparatus in response to the first wireless control signal, and the second wireless control signal including a communication quality when the second wireless communication apparatus receives the first wireless control signal, and
wherein, in response to the predetermined first communication quality measurement request signal, the access point apparatus measures a communication quality of the predetermined first communication quality measurement request signal, and transmits the first wireless control signal including the measured communication quality, as the first communication quality, to the first and second wireless communication apparatuses.

* * * * *